United States Patent [19]

Isaka

[11] 4,339,964
[45] Jul. 20, 1982

[54] INTERNAL COMBUSTION ENGINE WITH COMBINED TRANSMISSION CASE AND CRANKSHAFT CASE, AND INTERMEDIATE SHAFT

[75] Inventor: Yoshiharu Isaka, Shizuoka, Japan

[73] Assignee: Yamaha Hatsudoki Kabushiki Kaisha, Iwata, Japan

[21] Appl. No.: 96,382

[22] Filed: Nov. 21, 1979

[51] Int. Cl.³ ............................................. F16H 57/02
[52] U.S. Cl. ................................................. 74/606 R
[58] Field of Search ...................... 74/606 R, 352, 353

[56] References Cited

FOREIGN PATENT DOCUMENTS 1401052 7/1975 United Kingdom ............. 74/606 R

*Primary Examiner*—Kenneth Dorner
*Attorney, Agent, or Firm*—Donald D. Mon

[57] ABSTRACT

An internal combustion engine with reduced lateral dimensions. It includes a single case which contains both a crankshaft and a transmission. One is at an elevation above the other, and they are linked by an intermediate shaft. Accordingly, both the length and width of the engine can be minimized, which is important in vehicles such as motorcycles.

3 Claims, 6 Drawing Figures

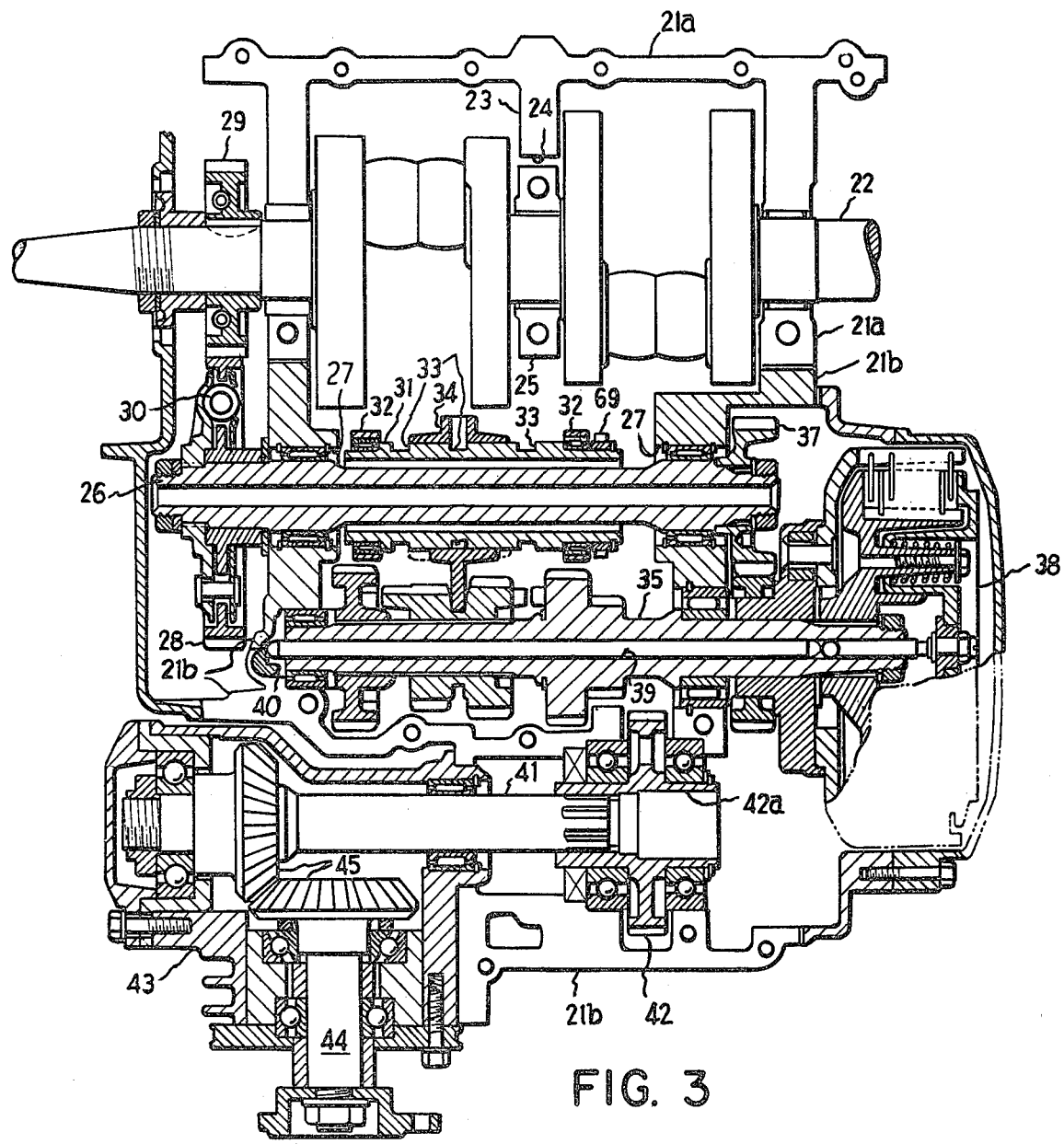
FIG. 3
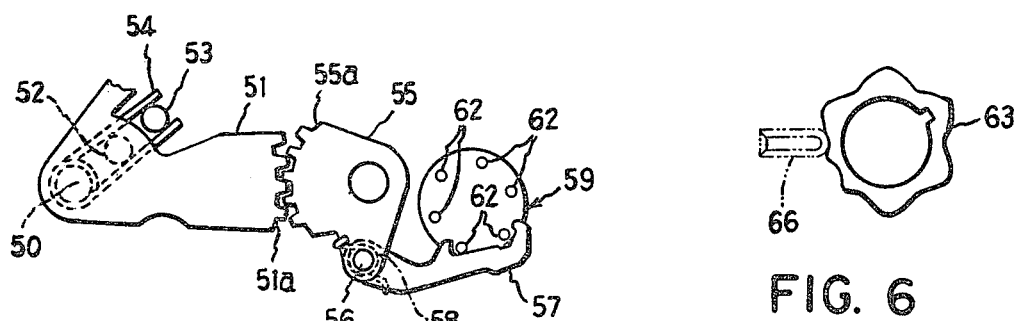
FIG. 5
FIG. 6

INTERNAL COMBUSTION ENGINE WITH COMBINED TRANSMISSION CASE AND CRANKSHAFT CASE, AND INTERMEDIATE SHAFT

FIELD OF THE INVENTION

This invention relates to internal combustion engines, and especially to engines for vehicles where it is advantageous to minimize the length and width of the engine, for example on motorcycles or in small cars.

BACKGROUND OF THE INVENTION

Motorcycle engines commonly have a built-in transmission, so that the crankcase also serves as the case for the transmission. Increase of the displacement of known engines of this type is accompanied by an increase in its length and width. The disadvantage inherent in enlargement of these dimensions is that when a motorcycle is turned, its body inclines laterally. Therefore, if the width of the engine (relative to the direction of forward travel) is increased, the attainable angle of bank, i.e., the angle by which the body can be inclined is decreased. With this in mind, it is a valid objective that the engine width should be made as small as possible, and that the attainable angles of bank at both sides of the vehicle are substantially identical.

The foregoing objectives are met with an engine according to this invention in which an intermediate shaft is interposed between a crankshaft and a transmission. In prior art engines, where there is no provision of the intermediate shaft, the rotations of the crankshaft have to be transmitted directly to the transmission main shaft. Since this main shaft is equipped at its center portion with a transmission gear train, the rotations of the crankshaft have to be transmitted to one end of the main shaft so that the transmission bulges sideways of the engine, with a resultant increase in the engine width. By effecting power transmission through the intermediate shaft, the transmission can be laid out in alignment with the center line of the engine, without requiring the transmission to bulge sideways of the engine.

Also in a conventional engine, the main and counter shafts of the transmission and the crankshaft are rotatably supported in the joint plane of the case. The length of the engine in the direction perpendicular to the crankshaft is accordingly increased. As a result, the motorcycle having a very restricted space available for mounting the engine is accompanied by the drawback that the mounting of the engine itself becomes difficult, and that the wheel base has to be increased.

The present invention provides a vehicular engine which can reduce the length in the direction perpendicular to the crankshaft. In order to attain this objective, the vehicular engine according to the present invention is so constructed that the crankshaft case is disposed above its joint plane with the transmission case, whereas the intermediate shaft is disposed below the same joint plane.

The invention will be fully understood from the following detailed description and the accompanying drawings, in which:

BRIEF DESCRIPTION OF THE DRAWINGS

FIG. 3 is a section taken along line III—III in FIG. 2 and shows the same engine;

FIG. 5 is a side elevation showing the drive mechanism; and

FIG. 6 is a side elevation showing a stopper plate.

In FIG. 1 there is shown a frame 1 which is equipped with a steering head pipe 2, a tank rail 3, and a pair of side tubes 4. A front fork 5, a front wheel 6, a rear wheel 7, and a pair or rear arms 8 carrying the rear wheel 7 are also shown. In the illustrated motorcycle, a shaft drive system is used and a drive shaft (not shown) is fitted in the lefthand one of the rear arms 8. Rear arms 8 are pivotally connected to the frame 1 by means of a pivot pin 9. A water-cooled four cylinder engine 10 is installed to the frame so that it is suspended from both sides of the aforementioned side tubes 4. Engine 10 is composed of forward and backward inclined banks 11 and 12, respectively, each of which has two cylinders. Intake pipes 13 are arranged substantially upright for the respective cylinders at the inner sides of banks 11 and 12. The upper portions of the intake pipes are gathered at an intake manifold (not shown) which is disposed in a recess (not shown) in the skin of a fuel tank 14. A air cleaner 15 depends from the intake manifold. A muffler 16 is disposed below engine 10. Exhaust gases are introduced to the muffler through exhaust pipes 17 and 18, the former of which extends in front of engine 10 from the outer side of the bank 11, and the latter of which extends between the aforementioned pivot pin 9 and the rear wheel 7 from the outer side of bank 12, so that both are connected to muffler 16. A radiator 20 is provided.

With reference to FIGS. 2 and 3, engine 10 will now be described. Engine 10 is of the double overhead cam shaft, four cycle type. Its crankcase is made integral with a transmission case 21. This case 21 is divided at a joint plane A into an upper case 21a for the crankshaft (crankcase portion) and lower case 21b for the transmission (transmission portion). A crankshaft 22 is journaled for rotation in upper case 21a, at an elevation above borne joint plane A. More specifically, crankshaft 22 is borne at three points, because upper case 21a is formed with a rib 23, which extends longitudinally of the vehicular body in a manner to correspond to the center bearing, and three notches 24 are formed at such three positions corresponding to the three bearings of the crankshaft 22, rotatably to support crankshaft 22. The center bearing portion of crankshaft 22 is supported rotatably between a notch 24 of the rib 23 and a bearing member 25 fixed thereto. The remaining two bearing portions to be borne are supported rotatably between the notches formed in both side walls of the upper case 21a and the projections formed in the lower case 21b, that they are fitted in the notches.

Figure 1:
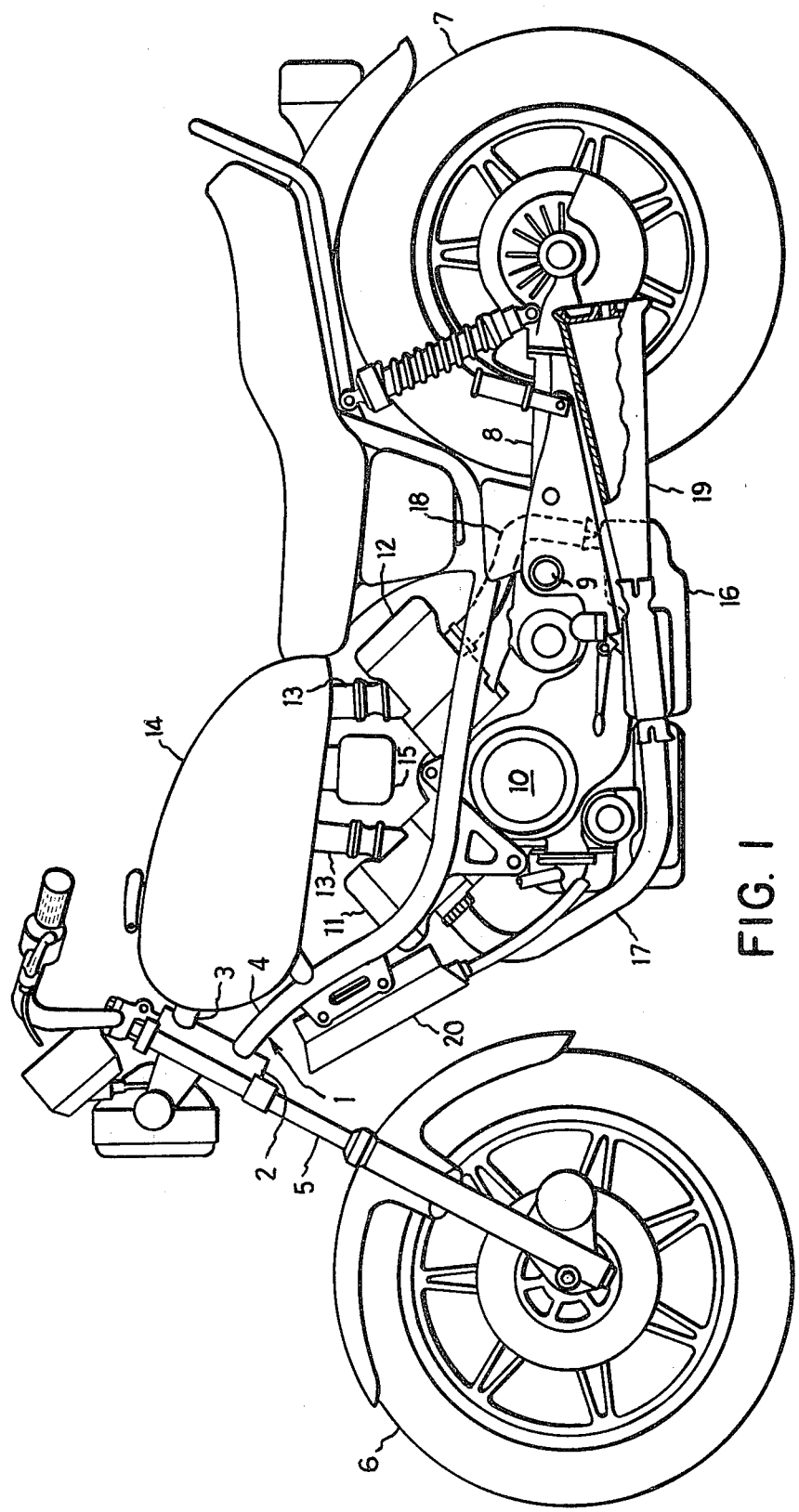
FIG. 1 is a side elevation showing a motorcycle to which one embodiment of the present invention is applied.

An intermediate shaft 26 is disposed below the aforementioned joint plane A. More specifically, the lower case 21b has in both of its side walls a through hole 27, in which the intermediate shaft 26 is rotatably supported by needle bearings. To the lefthand projection of intermediate shaft 26, there is splined a gear 28 which in turn is in meshing engagement with a gear 29 splined to crankshaft 22.

More specifically, in order to absorb those fluctuations in the torque of the crankshaft 22 which are caused by the intermittent explosions in the respective engine cylinders, gear 28 is constructed so as elastically to transmit the rotations through a coil spring 30. A transmission drum 31 is rotatably held on the outer circumference of the intermediate shaft 26 substantially in alignment therewith by means of a drum holder 32. The details of this drum holder 32 will be described later. The transmission drum is formed with three cam grooves 33 so that transmission forks 34 made engageable with cam grooves 33 are moved to the right and left as a result of the rotations of the transmission drum 31, thereby to interchange the meshing engagements of a later-described transmission gear train, thus effecting the gear changes.

A main shaft 35 and a counter shaft 36 are provided for the transmission gear train. Shaft 35 is supported rotatably in joint plane A, whereas shaft 36 is supported rotatably in the side walls of the lower case portion 21b. Rotations are transmitted to the main shaft 35 through both a gear 37, which is fixed to the righthand projection of intermediate shaft 26, and a wet type multi-disc clutch 38 which is held thereon. Incidentally, the clutch 38 is released by pushing the lefthand projecting end of a push rod 39, which extends through the main shaft 35, in response to the rotations of a push lever axle 40. The meshing engagement of the transmission gear train is interchanged by movement of the transmission forks 34 following the rotations of the transmission drum 31, as has been described before, thus changing the gear ratio.

An output shaft 41 is supported rotatably in the aforementioned joint plane A at the back of main shaft 35. The righthand end of the output shaft 41 is splined to a gear 42. More specifically, the gear 42 is formed with an integral sleeve 42a, which is supported rotatably by means of two bearings. Output shaft 41 is splined to gear 42 at its righthand end. Output shaft 41 is built in a gear box 43, which in turn is connected to the sleeve 42a of gear 42, such that the output shaft 41 is disposed in the joint plane A. The gear box 43 is equipped with a drive shaft 44, which extends at the right hand with respect to the output shaft 42, so that the transmission of rotations between output shaft 42 and drive shaft 44 is performed by means bevel gears 45. Drive shaft 44 is further connected through a synchronous joint (not shown) to the drive shaft (not shown) which is inserted into the lefthand one of the aforementioned arms.

Figure 4:
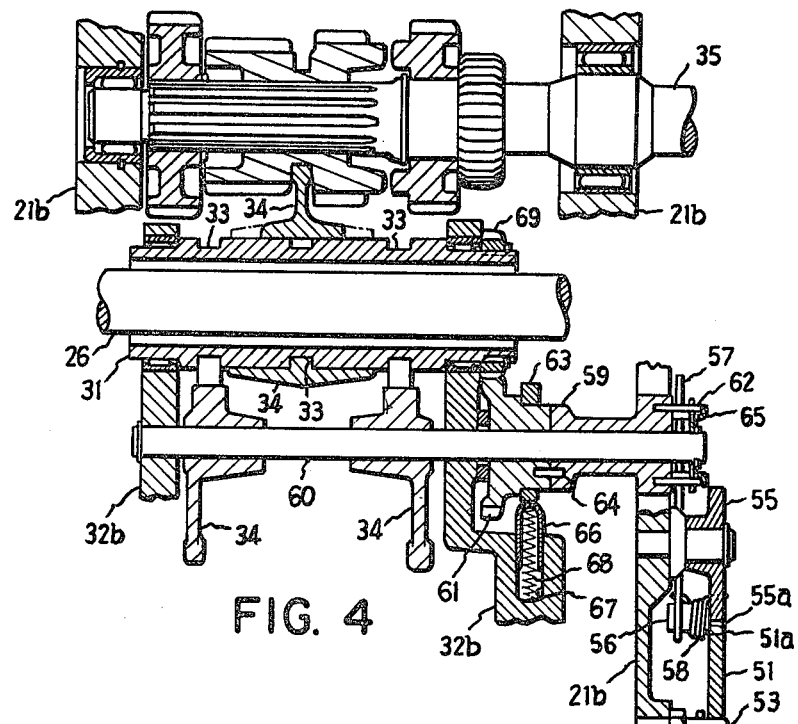
FIG. 4 is a section taken along line IV—IV in FIG. 2, and shows the drive mechanism of a transmission drum.
Figure 2:
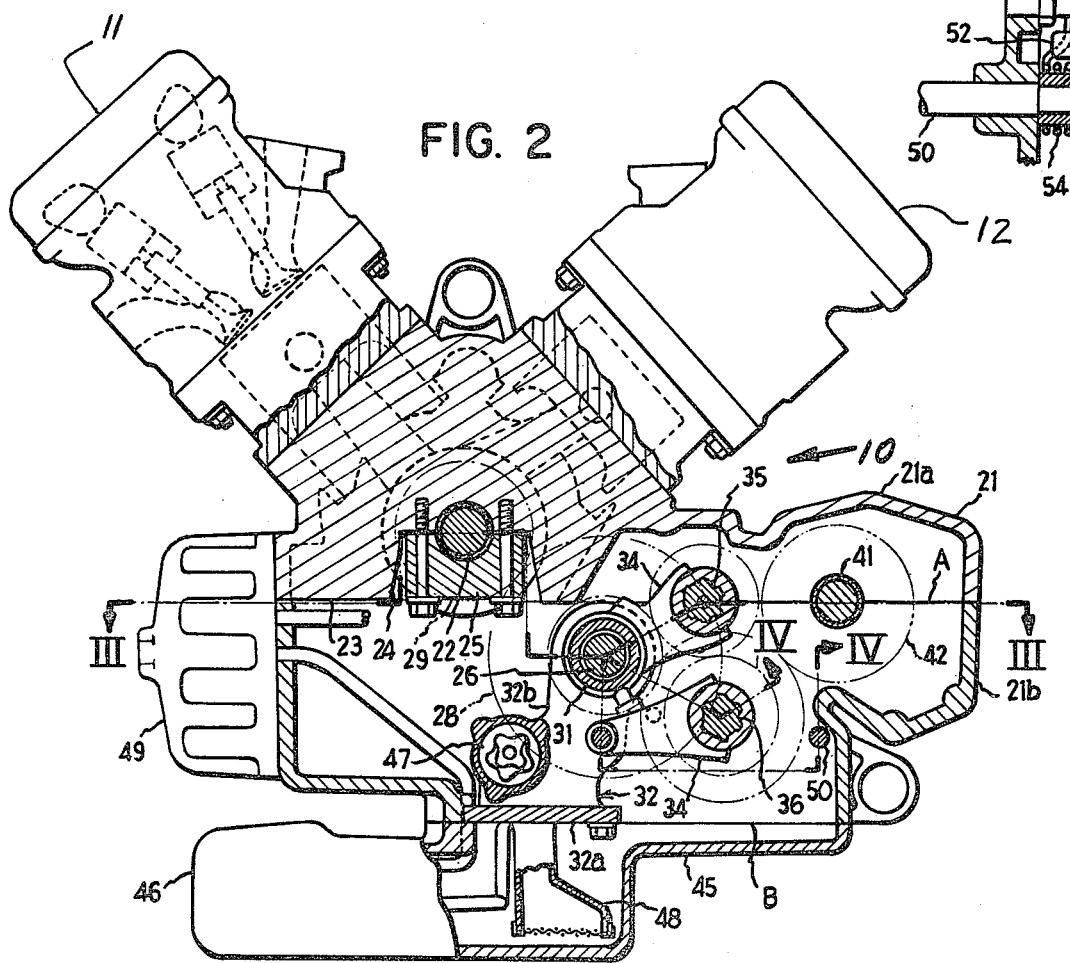
FIG. 2 is a longitudinal sectional side elevation showing the engine to be used in the motorcycle of FIG. 1.

Drum holder 32 for holding the aforementioned transmission drum 31 will now be described in detail. FIG. 4 is a section taken along line IV—IV, and shows the drive mechanism of transmission drum 31. As best seen in FIG. 2, an oil pan 45 is jointed at a joint plane B to the lower portion of the aforementioned lower case 21b and has its portion protruding forwardly to form an oil cooler 46. Oil cooler 46 is equipped with cooling fins so that lubricating oil is cooled while it flows through the fins. Drum holder 32 has a bottom plate 32a (as seen in FIG. 2), a pair of right and left side plates rising upright from both sides of bottom plate 32a, and an oil pump 47 including a trochoid pump. The drum holder 32 is fixed such that bottom plate 32a is clamped between the mating surfaces at joint plane B. More specifically, transmission drum 31 is supported rotatably in side walls 32b through bearings, and the drum holder 32 is so sized that drum 31 is aligned with intermediate shaft 26, bottom plate 32a being held in the joint plane B. In FIG. 2 an oil strainer 48 and an oil element 49 are shown. Thus, oil in oil pan 45 is sucked from oil strainer 48 into oil pump 47, and the oil discharged from pump 47 is pumped out to the respective parts of the engine through oil element 49 after it is cooled by oil cooler 46.

The drive mechanism of transmission drum 31 will be described with particular reference to FIGS. 4, 5 and 6. FIG. 5 is a side elevation showing that particular mechanism, and FIG. 6 is also a side elevation but shows a stopper plate. In FIGS. 2, 4 and 5 a transmission pedal shaft 50 is shown disposed transversely and at the back of counter shaft 36 and extending through lower case 21b. A gear change pedal (not shown) is fixed to the lefthand projection of pedal shaft 50. A first pedal 51 is fixed to the righthand projection of pedal shaft 50. First pedal 51 is formed with a general sector gear 51a. A pin 52 for lever 51 is studded in the righthand side wall of lower case portion 21b. Case portion 21b is also formed with a pin 53 which projects toward lever 51. There is mounted on the pedal shaft 50 between lower case portion 21b and lever 51 a torsion spring 54 which has its two legs retaining the pins 52 and 53. As a result, when the unillustrated transmission pedal is depressed or kicked up, pin 52 is turned together with lever 51. As a result, one leg of spring 54 is expanded by pin 52, the other being retained on pin 53. As a result, the gear change pedal and lever 51 are returned to the positions shown in FIG. 5. A second lever 55 is supported rotatably in the lower case portion 21b. Lever 55 is formed with a sector gear 55a which can mesh with gear 51a of first lever 51. Second lever 55 is studded at the side of lower case portion 21b with a pin 56 which pivotally supports a third lever 57. A torsion spring 58 is mounted on shaft 56, and biases third lever 57 to rotationally return counter-clockwise, as viewed in FIG. 5.

A rotor 59 is supported rotatably on a fork guide 60. More specifically, the two of the aforementioned three forks 34 which are operative to move the transmission gears of counter shaft 36, are guided by fork guide 60, extending through the side plates 32b of the aformentioned drum holder 32. Fork guide 60 has its righthand end extending through the lower case 21b. On this extension there is rotatably mounted the rotor 59, which carries a gear 61 at its left end and six dowel pins 62 at its right end. More specifically, rotor 59 is constructed so that it can be divided into two halves at the plane normal to the axis. Under the divided condition, a stopper plate 63 is mounted, and the halves of the rotor 59 are positioned by means of a positioning pin 64 and then are fixedly jointed. The aforementioned dowel pins 62 are so studded on the right end face of the rotor 59 that they are equidistantly arranged on the same circle, as seen in FIG. 5. The righthand ends of dowel pins 62 are retained on a side plate 65 which is held on fork guide 60. Third lever 57 engages with the lower two of dowel pins 62 from beneath (as seen in FIG. 5). On the other hand, stopper plate 63 is formed, as shown in FIG. 6, into a general hexagonal star shape having its one apex undulating. A drum stopper 66 is elastically forced into contact with the periphery of stopper plate 63. More specifically, righthand side plate 32b of drum holder 32 is formed with a stopper receiving recess 67, in which drum stopper 66 is received through a compression spring 68. A gear 69 is fixed on such a righthand end portion of drum 31 as faces gear 61, so that gears 61 and 69 are in meshing engagement with each other.

Now, if the gear change pedal (not shown) is depressed or kicked up, second lever 55 is turned by the first lever 51. As a result, third lever 57 is rocked to the right and left, as viewed in FIG. 5, so that the dowel pins 62 engaging therewith are consecutively advanced.

As a result, rotor 59 and gear 61 are turned together so that transmission drum 31 is turned by gear 69 engaging with gear 61. As a result, transmission forks 34 are shifted to the right and left so that the engaging relationships of the transmission gear train are interchanged to change the reduction ratio. Here, transmission drum 31 is positioned by the engagement between stopper plate 63 and its stopper 66.

Although, in the embodiment thus far described, crankshaft 22 and intermediate shaft 26 are arranged to extend laterally of the motorcycle body, the present invention can be so modified that those shafts are directed longitudinally of the body. In this modification, the width of the engine is so reduced that the angle of bank upon turning of the motorcycle can be accordingly increased.

Moreover, although the aforementioned embodiment is made by applying the present invention to a motorcycle, the present invention can also be applied to a vehicle such as a motor tricycle or an automobile. In this application, the length and width of the engine can be so changed as to fit the available engine mounting space.

As has been described hereinbefore, according to the present invention, since the crankshaft is disposed above the case joint plane of the transmission whereas the intermediate shaft is disposed below the said joint plane, the horizontal distance perpendicular to the crankshaft and the intermediate shaft can be reduced even if the spacing in between is unchanged. As a result, in case the engine is mounted such that the crankshaft is directed laterally of the vehicular body, the overall length of the engine can be reduced. If this construction is used in a motorcycle, a multi cylinder engine of large size can be mounted without considerably increasing the wheel base so that the very restricted space for mounting the engine can be used effectively. Incidentally, when the present invention is used, the vertical distance between the crankshaft and the intermediate shaft is increased. As a result, if the engine is mounted in the motorcycle, the center of gravity of the engine is slightly raised. Since, however, a motorcycle having the large engine of such type has a remarkably satisfactory running stability, the upward shift of the center of gravity to such an extent exerts no substantial influence upon the running stability, and provides the advantage that maneuverability during turning is improved.

This invention is not to be limited by the embodiments shown in the drawings and described in the description, which are given by way of example and not of limitation, but only in accordance with the scope of the appended claims.

I claim:

1. An internal combustion engine particularly suited for a motorcycle comprising:
    a single case having an internal cavity, said case comprising an upper and a lower portion jointed together at a joint plane;
    a crankshaft having an axis of rotation at an upper elevation in said cavity;
    a main shaft, and an output shaft geared to said main shaft, each having an axis; and
    an intermediate shaft having an axis of rotation, the axis of rotation of said intermediate shaft being at an elevation lower than the axis of rotation of said crankshaft, said upper portion housing said crankshaft above said joint plane, said lower portion housing said intermediate shaft below said joint plane, said main shaft and output shaft being housed in said case with their axes of rotation on said joint plane, all of said shafts axes being parallel, said crankshaft being drivingly engaged to said intermediate shaft, and said intermediate shaft being drivingly engageable with said main shaft.

2. An internal combustion engine according to claim 1 in which a transmission drum having a passage therethrough is mounted to said intermediate shaft, said intermediate shaft extending through said passage.

3. An internal combustion engine according to claim 1 in which said engine includes a forwardly and a backwardly inclined cylinder, each cylinder having a longitudinal axis forming a V between said longitudinal axis and thereby forming a plane normal to said crankshaft axis lying in a plane of the axes.

* * * * *